US012142219B1

(12) United States Patent
Koh et al.

(10) Patent No.: US 12,142,219 B1
(45) Date of Patent: Nov. 12, 2024

(54) INVERSE PIXEL BURN-IN COMPENSATION SYSTEMS AND METHODS

(71) Applicant: Apple Inc., Cupertino, CA (US)

(72) Inventors: Tae-Wook Koh, San Jose, CA (US); Mahesh B Chappalli, San Jose, CA (US); Jared S Price, Hayward, CA (US); Vincent Z Young, San Francisco, CA (US); Yifan Zhang, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/465,978

(22) Filed: Sep. 12, 2023

(51) Int. Cl.
*G09G 5/10* (2006.01)
*G09G 3/3233* (2016.01)

(52) U.S. Cl.
CPC ... *G09G 3/3233* (2013.01); *G09G 2320/0233* (2013.01); *G09G 2320/041* (2013.01); *G09G 2320/046* (2013.01)

(58) Field of Classification Search
CPC ......... G09G 3/3233; G09G 2320/0233; G09G 2320/041; G09G 2320/046
See application file for complete search history.

(56) References Cited

U.S. PATENT DOCUMENTS

| | | | | |
|---|---|---|---|---|
| 10,178,359 | B2 | 1/2019 | Thivin et al. | |
| 10,354,586 | B2 | 7/2019 | Maeyama | |
| 11,164,540 | B2 | 11/2021 | Holland et al. | |
| 11,361,729 | B2 | 6/2022 | Chappalli et al. | |
| 11,682,346 | B2 | 6/2023 | Lai et al. | |
| 2018/0190174 | A1* | 7/2018 | Kambhatla | G06T 1/20 |
| 2019/0066575 | A1 | 2/2019 | Song | |
| 2020/0058251 | A1* | 2/2020 | Lee | G09G 3/3225 |
| 2021/0183334 | A1* | 6/2021 | Holland | G09G 5/001 |
| 2022/0189400 | A1 | 6/2022 | Hong et al. | |
| 2022/0223104 | A1 | 7/2022 | Sun et al. | |
| 2023/0134326 | A1* | 5/2023 | Lee | G09G 3/3233 345/690 |

FOREIGN PATENT DOCUMENTS

| | | | |
|---|---|---|---|
| CN | 111179832 | A | 5/2020 |
| CN | 116229861 | A | 6/2023 |
| JP | 05990740 | B2 | 12/2013 |
| KR | 2023096469 | A | 6/2023 |
| WO | 2011010625 | A1 | 1/2011 |
| WO | 2022254137 | A1 | 12/2022 |
| WO | 2023024934 | A1 | 3/2023 |

* cited by examiner

*Primary Examiner* — Lixi C Simpson
(74) *Attorney, Agent, or Firm* — Fletcher Yoder P.C.

(57) ABSTRACT

An electronic device may include an electronic display having a pixel and that displays an image based on compensated image data. The electronic device may also include image processing circuitry communicatively coupled to the electronic display. The image processing circuitry may receive image data and determine a gain value for the pixel based on an aging value of the pixel that is based on previously displayed pixel values of the pixel. The image processing circuitry may also adjust the gain value based on a pixel value of the image data corresponding to the pixel to generate an updated gain value and adjust the pixel value of the image data based on the updated gain value to generate, at least in part, the compensated image data.

20 Claims, 11 Drawing Sheets

INVERSE PIXEL BURN-IN COMPENSATION SYSTEMS AND METHODS

BACKGROUND

This disclosure relates to image data processing to identify and compensate for burn-in/aging of pixels of an electronic display while also taking into account the potential for inverse burn-in/aging of the pixel, resulting in an increased pixel efficiency at increased aging.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—including televisions, portable phones, computers, wearable devices, vehicle dashboards, virtual-reality glasses, and more—display images on an electronic display. To display an image, an electronic display may control light emission of its display pixels based at least in part on corresponding image data. As electronic displays gain increasingly higher resolutions and dynamic ranges, they may also become increasingly more susceptible to image artifacts, such as burn-in related aging of pixels, that may be compensated by image processing.

Burn-in is a phenomenon whereby pixels degrade over time owing to the different amount of light that different pixels emit over time. In other words, pixels may age at different rates depending on their relative utilization and/or environment. For example, pixels used more than others may age more quickly, and thus may gradually emit less light when given the same amount of driving current or voltage values. This may produce undesirable burn-in image artifacts on the electronic display. In general, the estimated aging due to pixels' utilization may be stored, accumulated, and referenced when compensating for burn-in effects on pixel efficiency. However, while certain techniques may provide for burn-in compensation for pixel efficiency due to aging, such techniques may not account for non-monotonic aging profiles.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to identifying and/or compensating for non-uniform burn-in/aging of display pixels which may be non-monotonic and/or have an effect that varies depending on the applied luminance output of the pixel. In general, burn-in related aging may vary across an electronic display based on individual pixel usage (e.g., frequency and/or luminance output of the pixel) and/or the environment (e.g., temperature) thereof. As a result, some display pixels may gradually emit less light when given the same driving current or voltage values, effectively becoming darker than the other display pixels when given a signal for the same brightness level. In other words, the pixel efficiency of a display pixel is generally reduced as the display pixel ages.

As such, image processing circuitry and/or software may monitor and/or model the amount of burn-in related aging that is likely to have occurred in the different pixels and. By keeping track of the estimated amount of burn-in that has taken place in the electronic display, burn-in gain maps may be determined from the estimated amounts of aging (e.g., a burn-in history map) to compensate for the burn-in effects. For example, a burn-in compensation/burn-in statistics (BIC/BIS) block may include a BIS sub-block to track the estimated aging of the display pixels and a BIC sub-block to apply gains to pixel values of the image data to compensate for the burn-in related aging of the display pixels.

However, some devices may be subject to a non-monotonic aging profile. In other words, pixels of some types of electronic displays, may not follow a consistently downward efficiency trend as the pixels age. For example, certain organic light emitting diodes (OLEDs) may exhibit an increase in pixel efficiency at the outset of aging before turning to follow the typical downward efficiency trend with aging. As such, in some embodiments, the gain maps may compensate the image data for an increase in pixel efficiency, such as, for example, for estimated amounts of aging less than a threshold amount.

Furthermore, in some scenarios, the desired luminance output of a pixel may alter the decrease in pixel efficiency associated with burn-in related aging that would otherwise be compensated for via the gain maps. For example, for a given estimated amount of aging (e.g., along the downward efficiency trend) for a pixel, a gain value of a gain map may provide compensation for the corresponding decrease in pixel efficiency associated with the estimated amount of aging. However, the desired luminance output of the pixel may change the effective pixel efficiency due to parasitic capacitance within the pixel circuitry, causing an inverse burn-in effect. For example, at low luminance outputs (e.g., less than 1 nit, less than 5 nits, less than 10 nits, and so on depending on implementation and/or physical pixel characteristics), parasitic capacitance in the pixel circuitry may increase the effective voltage and/or current supplied to the pixel, increasing the effective pixel efficiency. Furthermore, the increase in pixel voltage and/or current supplied to the pixel to offset the expected decrease in pixel efficiency due to aging, may exacerbate the parasitic capacitance's effect, leading to an inverse burn-in effect, where, as the pixel ages and normal aging compensation is applied, the pixel appears to exhibit increased pixel efficiency. In other words, at low luminance outputs, the gain that would otherwise be applied to compensate for the burn-in related aging of the pixel may overcompensate the image data for the pixel value leading to image artifacts. Therefore, in some embodiments, the gain values of the gain maps may be altered (e.g., via two-dimensional look-up-table (LUT)) based on the desired luminance outputs of the pixels to reduce, negate, or invert the compensation that would otherwise be applied.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
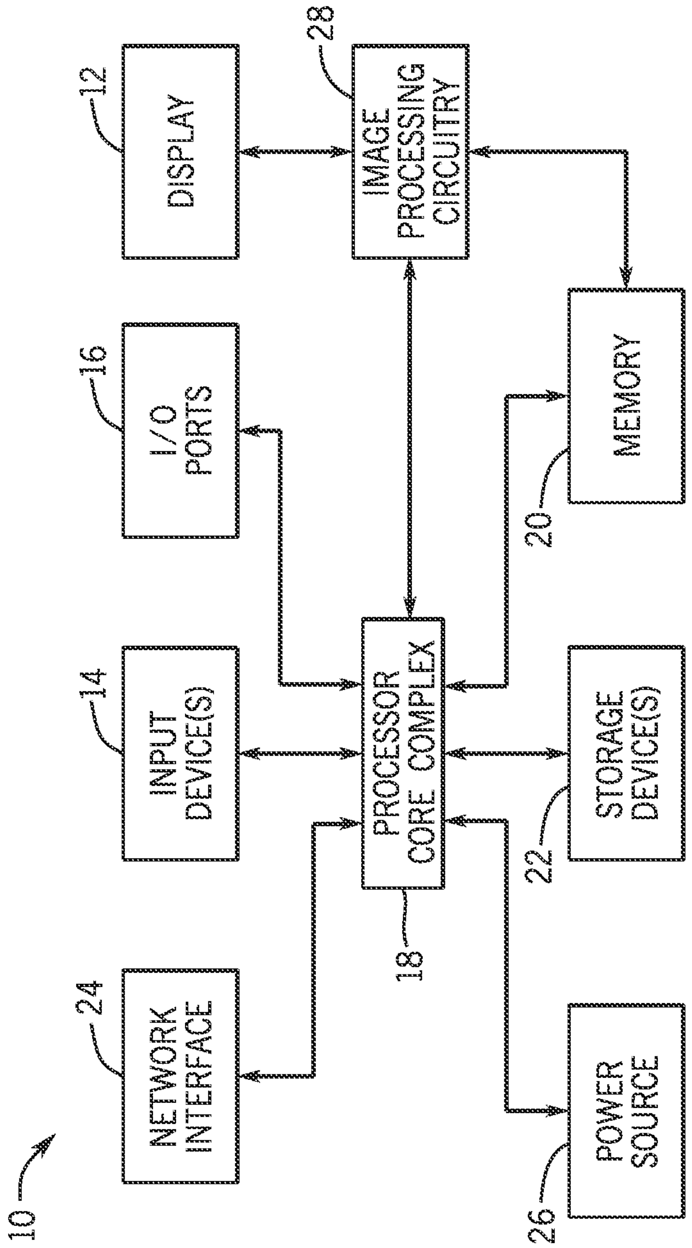
FIG. 1 is a schematic diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma-corrected luminance values.

Additionally, the image data may be processed to account for one or more physical or digital effects associated with displaying the image data. For example, burn-in/aging of display pixels may be estimated based on the frequency, luminance output, and/or environment (e.g., temperature) of the display pixels. Indeed, as display pixels are utilized throughout the life of the electronic display, the pixel efficiencies of the display pixels may be reduced. In general, by keeping track of the estimated amount of burn-in that has taken place in the electronic display, gain maps of gain values associated with individual pixels or groups of pixels may be determined to compensate for the effects of burn-in. The gain maps may gain down image data that will be sent to the less-aged pixels (which would otherwise be brighter) without gaining down, or by gaining down less, the image data that will be sent to the pixels with the greatest amount of aging (which would otherwise be darker). In this way, the pixels of the electronic display that are likely to exhibit the greatest amount of aging will appear to be equally as bright as pixels with less aging. Additionally or alternatively, pixels with the higher amounts of estimated burn-in may be gained up to compensate for their reduced luminance output depending on the capabilities of the pixels relative to the desired luminance levels. As such, perceivable burn-in artifacts on the electronic display may be reduced or eliminated.

However, while such techniques may provide for burn-in compensation for pixel efficiency due to aging, such techniques, alone, may not account for non-monotonic aging and/or inverse burn-in effects that vary depending on the current luminance output of the pixel. For example, in some scenarios, the desired luminance output of a pixel may alter the decrease in pixel efficiency associated with burn-in related aging that would otherwise be compensated for via the gain maps. For example, for a given estimated amount of aging (e.g., along the downward efficiency trend) for a pixel, a gain value of a gain map may provide compensation for the corresponding decrease in pixel efficiency associated with the estimated amount of aging. However, the desired luminance output of the pixel may change the effective pixel efficiency due to parasitic capacitance within the pixel circuitry, causing an inverse burn-in effect. For example, at low luminance outputs (e.g., less than 1 nit, less than 5 nits, less than 10 nits, and so on depending on implementation and/or physical pixel characteristics), parasitic capacitance in the pixel circuitry may increase the effective voltage and/or current supplied to the pixel, increasing the effective pixel efficiency.

Furthermore, the increase in pixel voltage and/or current supplied to the pixel to offset the expected decrease in pixel efficiency due to aging, may exacerbate the parasitic capacitance's effect, leading to an inverse burn-in effect, where, as the pixel ages and normal aging compensation is applied, the pixel appears to exhibit increased pixel efficiency. In other words, at low luminance outputs, the gain that would otherwise be applied to compensate for the burn-in related aging of the pixel may overcompensate the image data for the pixel value leading to image artifacts. Therefore, in some embodiments, the gain values of the gain maps may be altered based on the desired luminance outputs of the pixels to reduce, negate, or invert the compensation that would otherwise be applied.

Additionally or alternatively, some devices may be subject to a non-monotonic aging profile. In other words, pixels of some types of electronic displays, may not follow a consistently downward efficiency trend as the pixels age. For example, certain organic light emitting diodes (OLEDs) may exhibit an increase in pixel efficiency at the outset of aging before turning to follow the typical downward efficiency trend with increased aging. As such, in some embodiments, the gain maps may compensate the image data for an increase in pixel efficiency, such as, for example, for estimated amounts of aging less than a threshold amount.

With the foregoing in mind, FIG. 1 is an example electronic device 10 with an electronic display 12 having multiple display pixels. As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a BLUETOOTH® network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by or received from an image source, such as the processor core complex 18, a graphics processing unit (GPU), storage device 22, or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
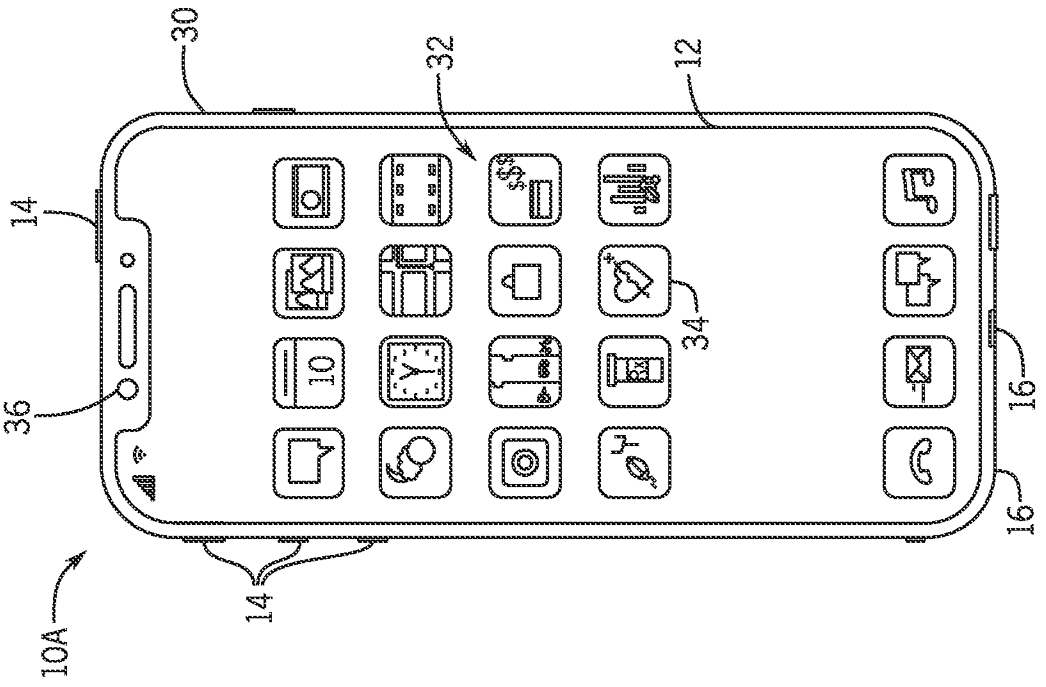
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
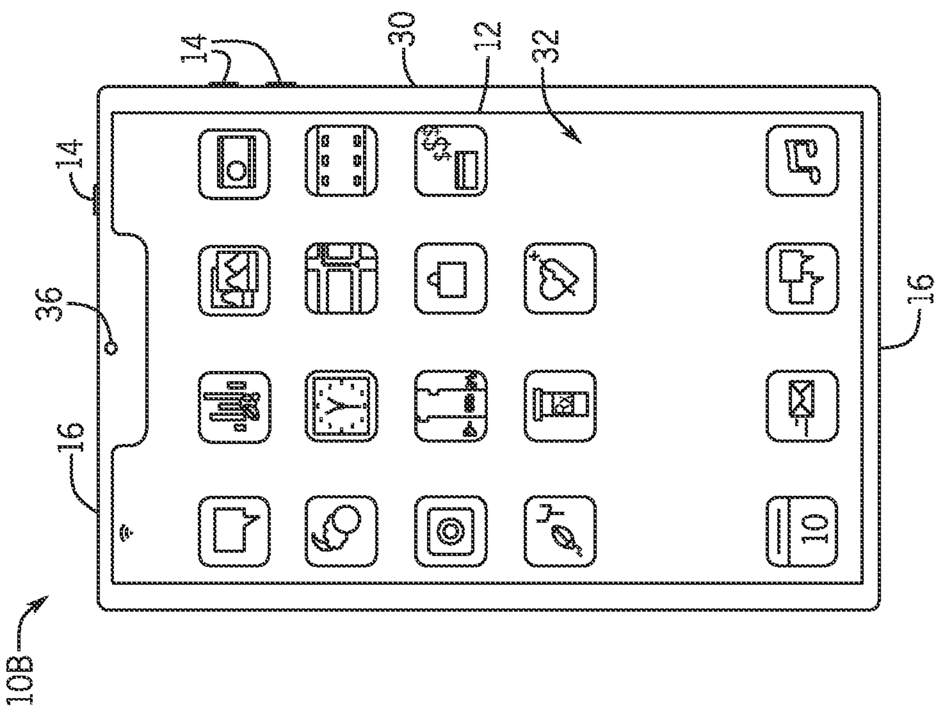
FIG. 3 is another example of the electronic device of FIG. 1 in the form of a tablet device, in accordance with an embodiment.
Figure 4:
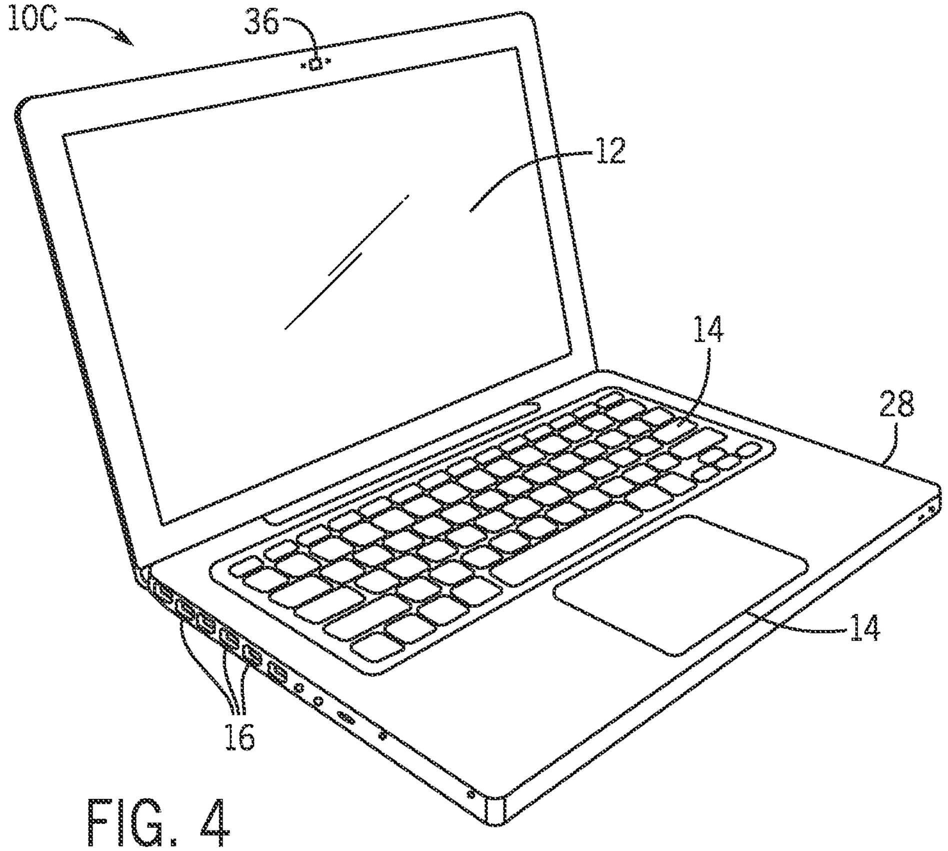
FIG. 4 is another example of the electronic device of FIG. 1 in the form of a computer, in accordance with an embodiment.
Figure 5:
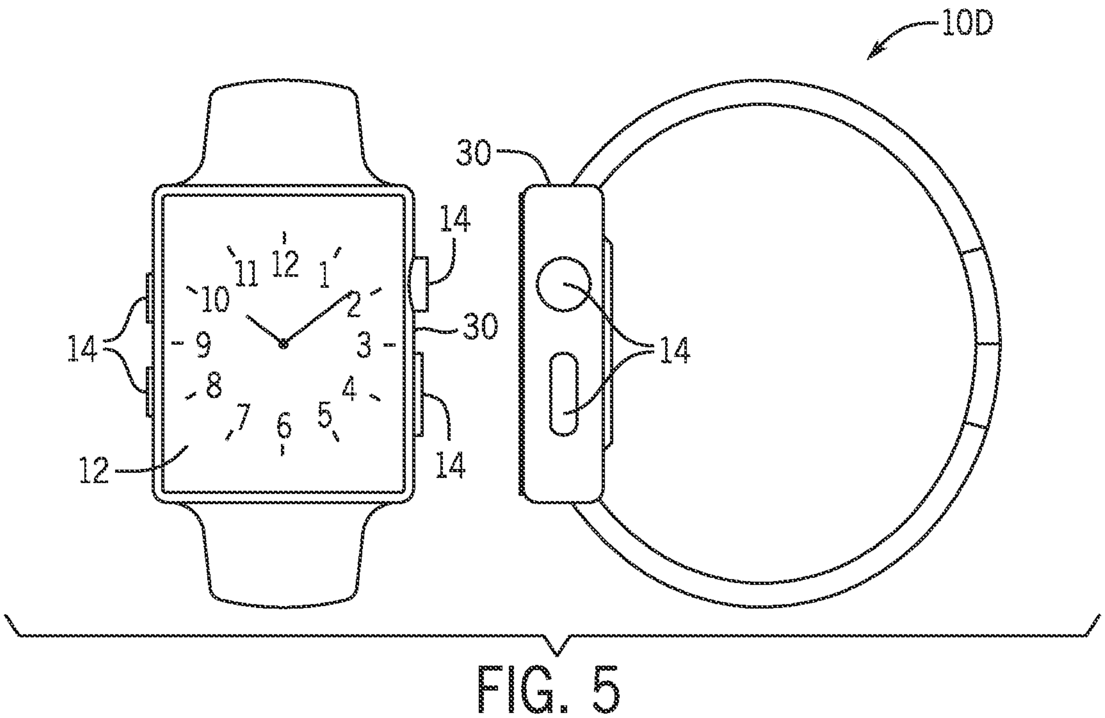
FIG. 5 is another example of the electronic device of FIG. 1 in the form of a watch, in accordance with an embodiment.

Another example of a suitable electronic device 10, specifically a tablet device 10B, is shown in FIG. 3. For illustration purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
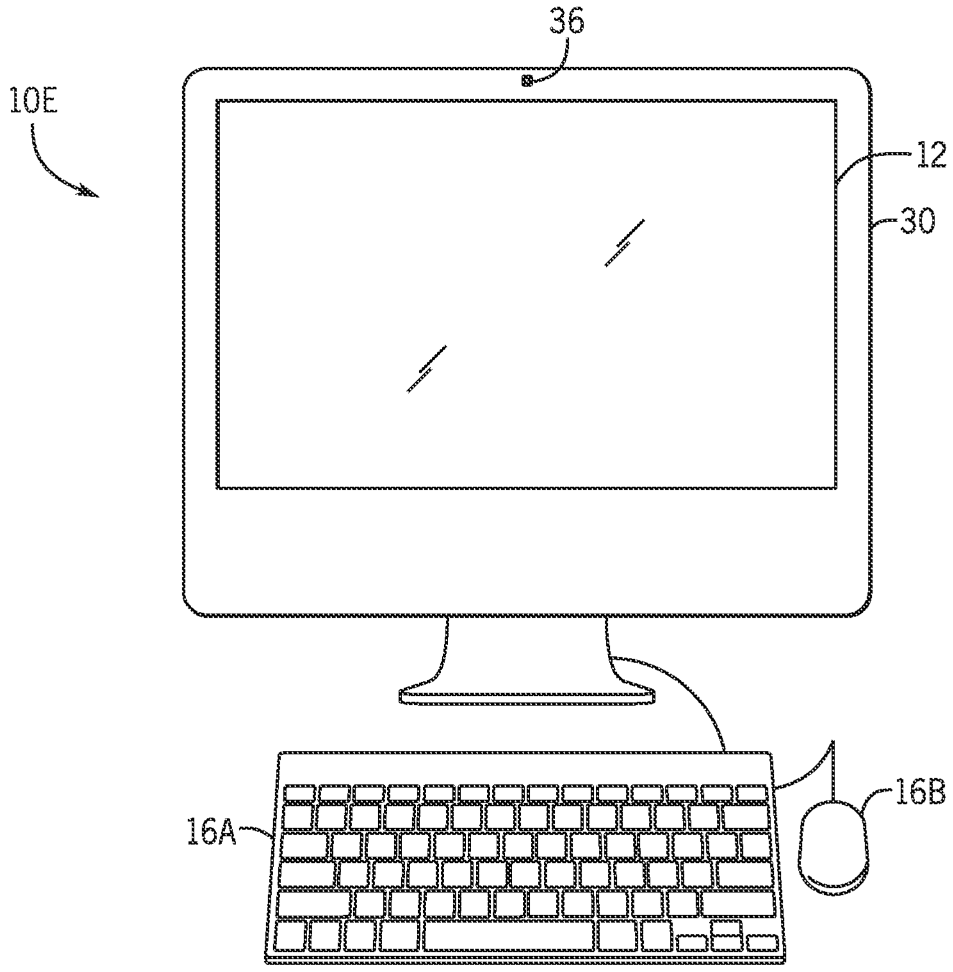
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an IMAC®, a MACBOOK®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. Moreover, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
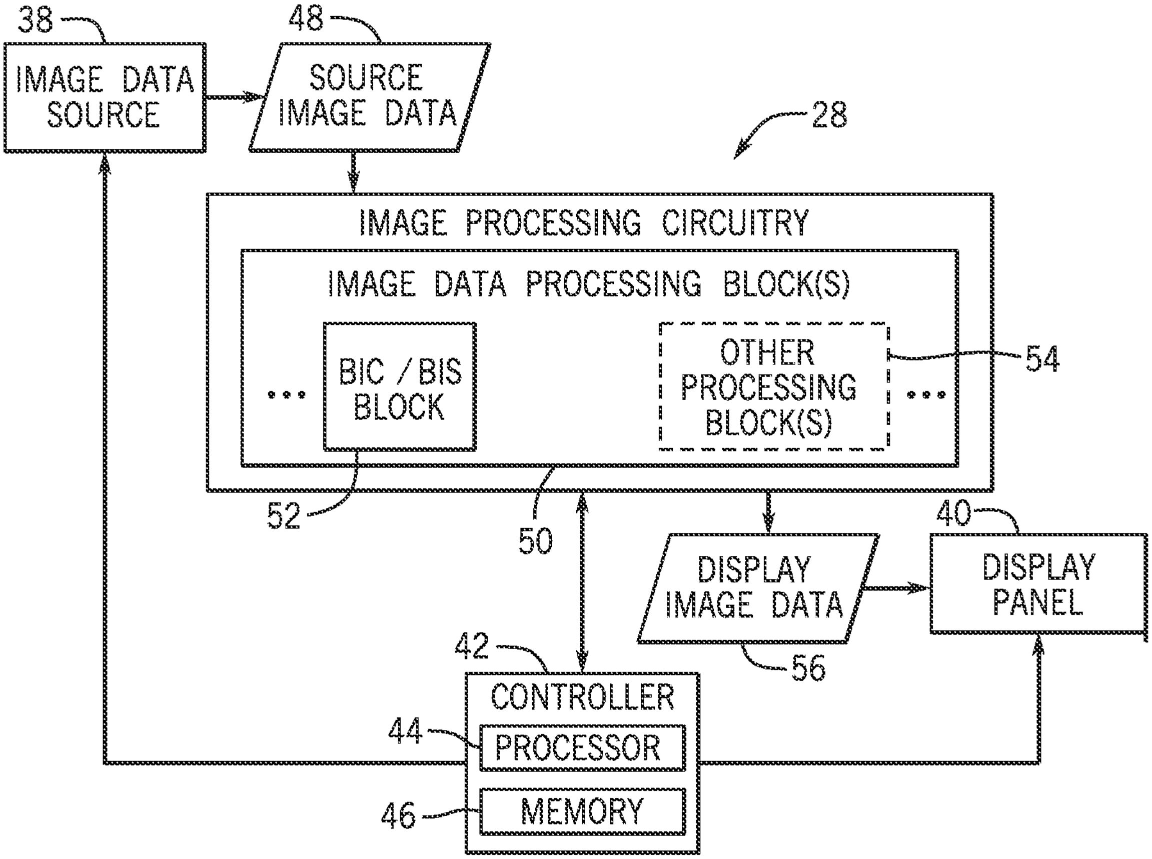
FIG. 7 is a schematic diagram of the image processing circuitry of FIG. 1 including a burn-in compensation (BIC)/burn-in statistics (BIS) block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware and/or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a self-emissive display (e.g., organic light-emitting-diode (OLED) display, micro-LED display, etc.), a transmissive display (e.g., liquid crystal display (LCD)), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. Moreover, as used herein, pixel data/values of image data may refer to individual color component (e.g., red, green, and blue) data values corresponding to pixel positions of the display panel.

As described above, the image processing circuitry 28 may operate to process source image data 48 received from the image data source 38. The image data source 38 may include captured images (e.g., from one or more cameras 36), images stored in memory, graphics generated by the processor core complex 18, or a combination thereof. Additionally, the image processing circuitry 28 may include one or more image data processing blocks 50 (e.g., circuitry, modules, or processing stages) such as a burn-in compensation (BIC)/burn-in statistics (BIS) block 52. As should be appreciated, multiple other processing blocks 54 may also be incorporated into the image processing circuitry 28, such as a pixel contrast control (PCC) block, color management block, a dither block, a blend block, a warp block, a scaling/rotation block, a crop block, etc. before and/or after the BIC/BIS block 52. The image data processing blocks 50 may receive and process source image data 48 and output display image data 56 in a format (e.g., digital format, image space, and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50. After processing, the image processing circuitry 28 may output the display image data 56 to the display panel 40. Based at least in part on the display image data 56, analog electrical signals may be provided to pixels of the display panel 40 to illuminate the pixels at a desired luminance level and display a corresponding image.

Figure 8:
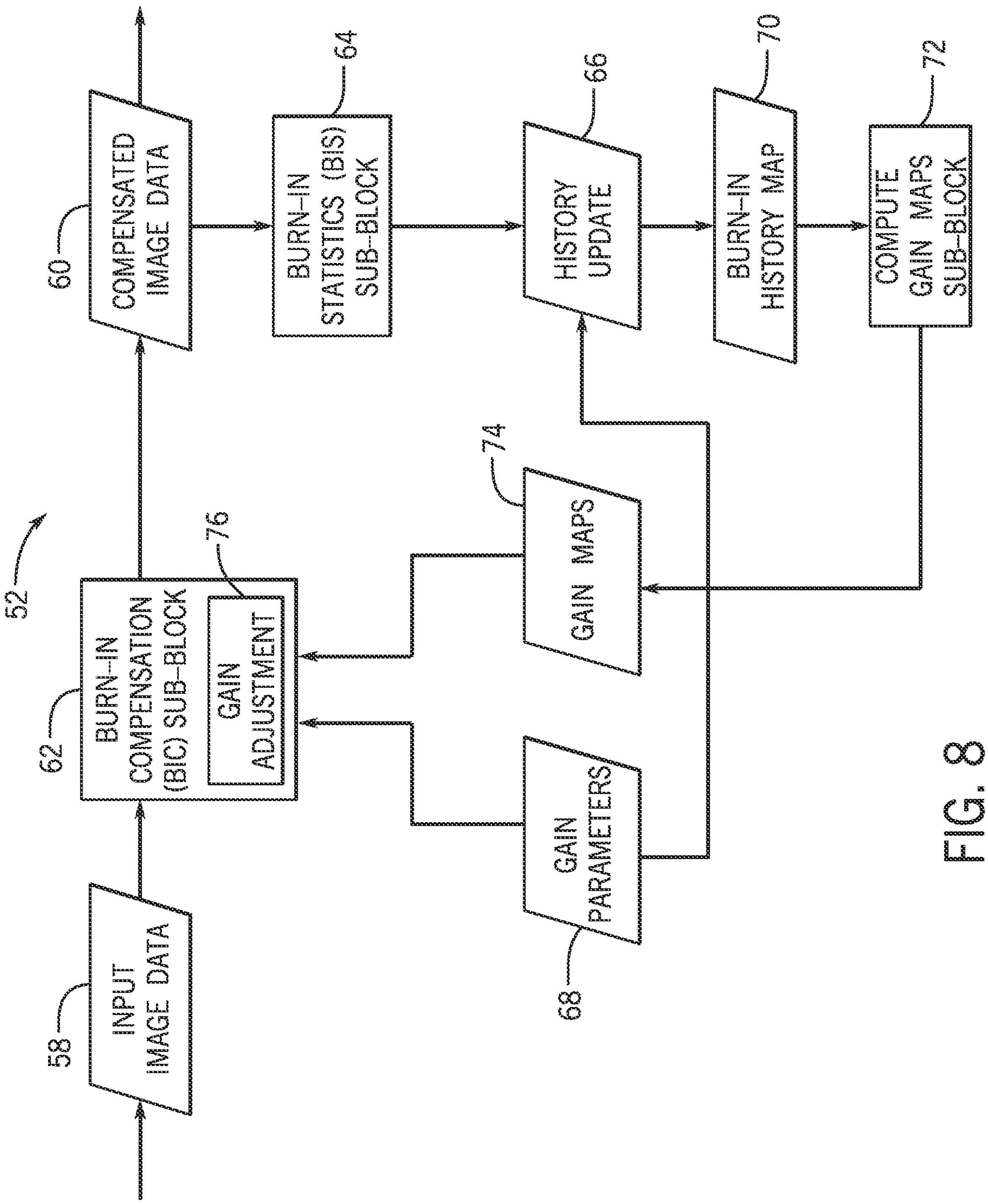
FIG. 8 is a schematic diagram of the BIC/BIS block of FIG. 7 including a BIC sub-block and a driver BIS sub-block, in accordance with an embodiment.

As discussed herein, the image processing circuitry may include a BIC/BIS block 52 to collect statistics about the degree to which burn-in is expected to have occurred on the electronic display 12 and compensate for burn-in related aging to reduce or eliminate the visual effects of burn-in. As such, the BIC/BIS block 52 may receive input image data 58 (e.g., pixel values) and generate compensated image data 60 (e.g., via a burn-in compensation (BIC) sub-block 62) by applying gains to the input image data 58, as shown in the schematic diagram of the BIC/BIS block 52 of FIG. 8. The input image data 58 may be in any suitable format (e.g., linear domain, gamma domain, current domain) and may be indicative of the source image data 48 or image data at any point within the image processing circuitry 28 (e.g., before and/or after other processing blocks 54) leading to the BIC/BIS block 52. Moreover, the compensated image data 60 may be output as display image data 56 or further processed via one or more other processing blocks 54 after the BIC/BIS block 52.

Based on the compensated image data 60, which may more closely resemble the pixel utilizations than the input image data 58, a burn-in statistics (BIS) sub-block 64 may generate a burn-in history update 66. The history update 66 is an incremental update representing an increased amount of pixel aging that is estimated to have occurred since a corresponding previous history update 66. As should be appreciated, history updates 66 may be performed for each image frame, sub-sampled at a desired frequency (e.g., every other image frame, every third image frame, every fourth image frame, and so on), and/or the pixels may be divided into groups such that each group of pixels is sampled over a different image frame. In some embodiments, gain parameters 68 such as a normalization factor, a brightness adaptation factor, a duty cycle, and/or a global brightness setting, may be used in generating the history update 66 to determine or otherwise calculate the estimated amount of pixel aging. Furthermore, each history update 66 may be aggregated to maintain a burn-in history map 70 indicative of the total estimated burn-in that has occurred to the display pixels of the electronic display 12.

Figure 9:
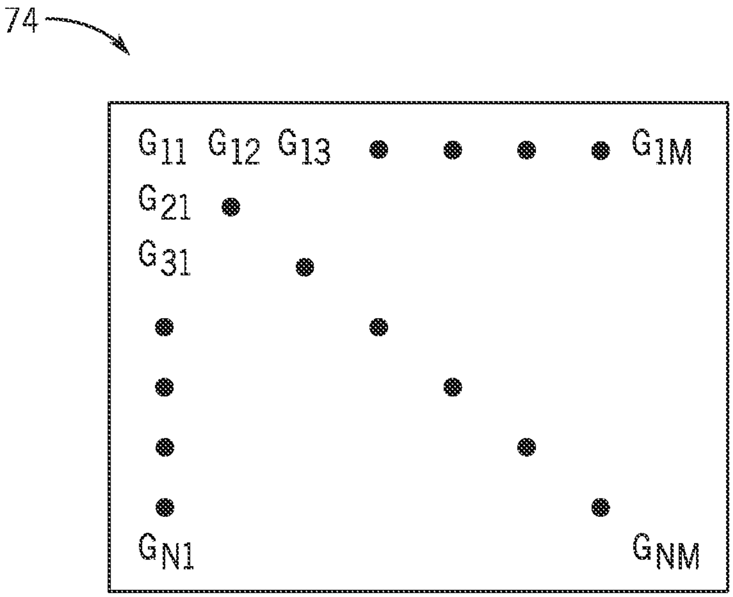
FIG. 9 is an example 2D depiction of a gain map, in accordance with an embodiment.
Figure 10:
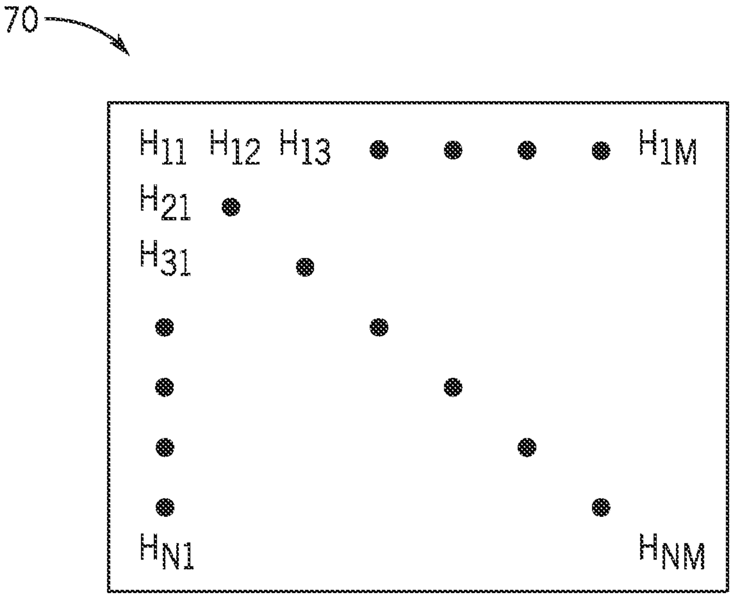
FIG. 10 is an example 2D depiction of a burn-in history map, in accordance with an embodiment.

To compensate the input image data 58, gain maps 74 may be generated (e.g., via a compute gain maps sub-block 72) based on the burn-in history map 70. In some embodiments, the gain maps 74 may be two-dimensional (2D) maps (e.g., a gain map 74 for each color component pixel type) of per-pixel gains based on the changes in efficiency of the pixels, as tracked via the burn-in history map 70. To help illustrate, FIG. 9 is an example 2D depiction of a gain map 74, and FIG. 10 is an example 2D depiction of a burn-in history map 70, each indexed by pixel location of a grid of N×M pixels. As should be appreciated, while shown as a 2D table, any suitable data structure (e.g., vector, string, etc.) may be utilized to correlate pixels with their corresponding burn-in history and gain values. In some embodiments, the gain maps 74 may be programmed into 2D lookup tables (LUTs) for efficient use by the BIC sub-block 62. Furthermore, in some embodiments, the compute gain maps sub-block 72 may be implemented in hardware (e.g., as part of the BIC sub-block 62), in software (e.g., via the controller processor 44 or other processor of the electronic device 10), or partially in both.

Additionally, in some embodiments, the burn-in history map 70 and/or gain maps 74 may be sub-sampled. For example, the burn-in history map 70 and/or the gain maps 74 determined therefrom may be compressed to provide reduced bandwidth and/or cache utilization. The burn-in history map 70 (e.g., sub-sampled) may be upsampled to the resolution of the electronic display 12 to generate the gain maps 74 or used to generate the gain maps 74 at the sub-sampled resolution, and the gain maps 74 may be upsampled to the resolution of the electronic display 12 and/or input image data 58. Additionally or alternatively, the burn-in history map 70 may be stored in a downsampled format, having fewer values than the number of pixels of the electronic display 12, and the burn-in history map 70 may be upsampled prior to generating the gain maps, or used to generate the gain maps 74 at the downsampled resolution, and the gain maps 74 may be upsampled to the resolution of the electronic display 12 and/or input image data 58.

Returning to FIG. 8, the gain maps 74 generated based on previous sets of compensated image data may be used by the BIC sub-block 62 to compensate the current set of input image data 58 and generate corresponding compensated image data 60. Additionally, the BIC sub-block 62 may utilize one or more gain parameters 68 that augment the gain maps 74 to account for global and/or average display characteristics for the image frame. For example, the gain parameters 68 may include a normalization factor, which may vary depending on the global brightness setting of the electronic display 12, the maximum gain to be applied, the emission duty cycle of the pixels, and/or for which color component (e.g., red, green, or blue) the gain parameters 68 is applied. As should be appreciated, the gain parameters 68 discussed herein are non-limiting, and additional parameters may also be included in determining the compensated image data 60 such as floating or fixed reference values and/or parameters representative of the type of display panel 40. As such, the gain parameters 68 may represent any suitable parameters that the BIC/BIS block 52 may use to appropriately adjust the values of and/or apply the gain maps 74 to compensate for burn-in.

In general, as pixels are utilized throughout the life of the electronic display 12, the pixel efficiencies of the pixels may be reduced. For example, the more luminance output provided by a particular pixel over the life of the display, the more burn-in related aging the pixel may exhibit. As such the gain maps 74 may gain down the input image data 58 associated with less-aged pixels without gaining down, by gaining down less, or by up gaining the image data associated with pixels having greater amounts of aging. However, in some scenarios, non-monotonic aging may be exhibited such that the pixel efficiency is increased during the early stages of aging, before following a downward efficiency trend with aging. For example, certain types of pixels may exhibit an increase in pixel efficiency at the outset of aging before turning to follow the typical downward efficiency trend with increased aging. As such, in some embodiments, the gain maps 74 may compensate the input image data 58 for an increase in pixel efficiency, such as, for example, for estimated amounts of aging (e.g., burn-in history values) less than a threshold amount.

Figure 11:
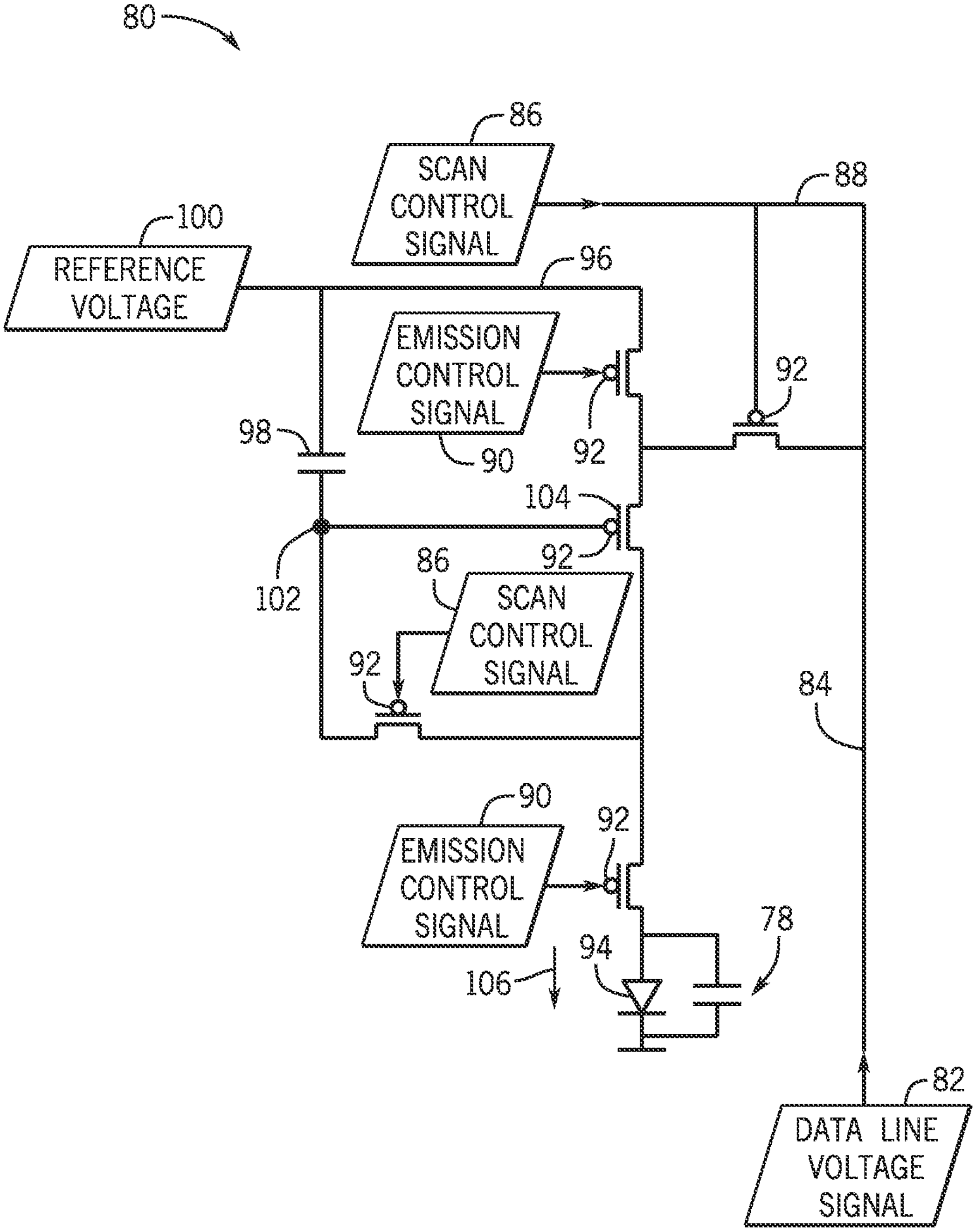
FIG. 11 is a schematic diagram of pixel circuitry, in accordance with an embodiment.

Additionally or alternatively to using gain maps 74 adapted for non-monotonic aging (e.g., based on the burn-in history map 70), the BIC sub-block 62 may include a gain adjustment 76 to adjust the gain values of the gain maps 74 based on the desired luminance output of the pixels (e.g., based on the input image data 58 and/or gain parameters 68). For example, as discussed herein, in some scenarios, a parasitic capacitance 78 within the pixel circuitry 80, as exampled in the schematic diagram of FIG. 11, may invert the typical relationship that correlates decreased pixel efficiency with increased burn-in related aging.

In general, the pixel circuitry 80 may be controlled by a data line voltage signal 82 (e.g., on data line 84), a scan control signal 86 (e.g., on scan line 88), and/or an emission control signal 90. For example, the data line voltage signal 82 may be an analog voltage signal indicative of the compensated image data 60 (e.g., compensated pixel data of luminance values), and the scan control signal 86 may be a selection signal to access a specific pixel by operating one or more switching devices 92. Additionally, the emission control signal 90 may connect or disconnect a light emissive element 94 (e.g., an organic or micro light emitting diode) of the pixel circuitry 80 and/or a reference voltage supply line 96, for example, to disconnect the light emissive element 94 when a new data line voltage signal 82 is being written (e.g., programmed) to the pixel circuitry 80 and to connect the light emissive element 94 for illumination.

The switching devices 92 may be of any suitable type of electrical switch (e.g., p-type metal-oxide-semiconductor (PMOS) transistors, n-type metal-oxide-semiconductor (NMOS) transistors, etc.). In the depicted example, a storage capacitor 98 is coupled between the reference voltage supply line 96 (e.g., supplying the reference voltage 100) and an internal (e.g., current control) node 102. Additionally, the voltage at the internal node 102 may control a gate 104 of a switching device 92. The light emission from the light emissive element 94 may be varied based on the magnitude of electrical current supplied to the light emissive element 94, which may be controlled by the voltage at the internal node 102 applied to the gate 104. Moreover, the switching device 92 controlled by the gate 104 may be operated in its linear mode (e.g., region) such that its channel width and, thus, permitted current flow varies proportionally with the voltage of the internal node 102. Thus, to facilitate controlling light emission, the data line voltage signal 82 may be used to set the voltage at the internal node 102 and, therefore, regulate the current flow from the reference voltage supply line 96. As should be appreciated, the above description of the pixel circuitry 80 is given as an example, and other configurations or pixel circuitry 80 may be utilized depending on implementation.

As discussed herein, a parasitic capacitance 78 may be exhibited within the pixel circuitry 80 to effect an increased current 106 through the light emissive element 94. Moreover, the relative weight/effect of the parasitic capacitance 78 on the pixel efficiency may vary depending on the desired luminance output of the pixel. For example, the effects of the parasitic capacitance may be more pronounced (e.g., noticeable) at lower luminance outputs (e.g., less than 1 nit, less than 5 nits, less than 10 nits, and so on depending on implementation and/or physical pixel characteristics), whereby the parasitic capacitance 78 in the pixel circuitry 80 may increase the effective voltage and/or current supplied to the light emissive element 94 such that a noticeable increase in pixel luminance occurs. Additionally, the parasitic capacitance 78 may also be more pronounced at higher refresh rates of the electronic display 12. For example, a display panel 40 operating at 120 Hertz may have a higher likelihood of exhibiting the effects of parasitic capacitance 78 than a display panel operating at 60 Hertz.

Furthermore, the increase in pixel voltage and/or current, associated with gain values of the gain maps 74, supplied to the light emissive element 94 to offset the expected decrease in pixel efficiency due to aging, may exacerbate the effect of the parasitic capacitance 78, leading to an inverse burn-in effect, whereby, as the pixel ages and normal aging compensation is applied, the pixel appears to exhibit increased pixel efficiency. In other words, at low luminance outputs, the gain that would otherwise be applied to compensate for the burn-in related aging of the pixel may overcompensate the input image data 58 for the pixel value, which may lead to image artifacts being displayed. As such, in some embodiments, a gain adjustment 76 may be made to the gain values of the gain maps 74 based on the desired luminance outputs of the pixels to reduce, negate, or invert the compensation that would otherwise be applied.

Figure 12:
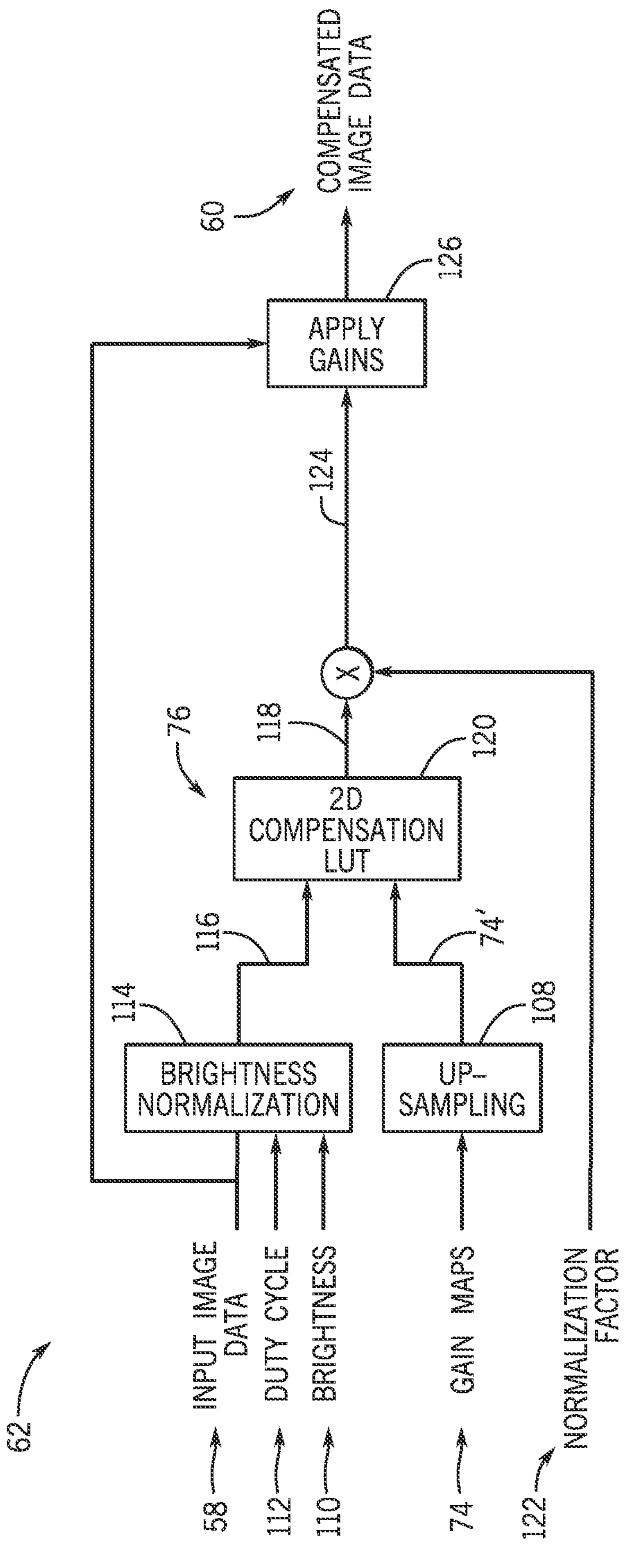
FIG. 12 is a schematic diagram of the BIC sub-block of FIG. 8, in accordance with an embodiment.

FIG. 12 is a schematic diagram of the BIC sub-block 62 including a gain adjustment 76. As discussed above, in some embodiments, the gain maps 74 may be computed (e.g., via the compute gain maps sub-block 72) from a burn-in history map 70. Additionally, in some scenarios, the gain maps 74 may undergo upsampling 108 (e.g., generating upsampled gain maps 74') to match the resolution of the input image data 58 and/or the electronic display 12. As should be appreciated, if the burn-in history map 70 or gain maps 74 are maintained, generated, and/or sampled at the full pixel resolution, upsampling 108 may be bypassed or removed.

Additionally, as discussed above, the relative effect (e.g., amount of increased current 106 relative to the nominal current for the desired luminance output of the light emissive element 94) of the parasitic capacitance 78 of the pixel circuitry 80 may be greater at lower luminance outputs. However, while the input image data 58 includes the pixel values, the luminance outputs of the pixels may also be defined by one or more gain parameters 68, such as the global brightness setting 110 and/or a duty cycle factor 112 (e.g., representative of the emission duty cycle of the pixels over the image frame). Indeed, the same pixel value of the input image data 58 at a higher global brightness setting 110, which may correspond to a higher duty cycle 112, also corresponds to a higher luminance output of the pixel. As such, the BIC sub-bock 62 may include a brightness normalization 114 of input image data 58 based on the global brightness setting 110 and/or the duty cycle 112. The brightness normalization 114 generates brightness-normalized pixel values 116, which incorporates information regarding the per-channel contribution of the duty cycle factor 112 and global brightness setting 110 for the current image frame along with the input image data 58. As should be appreciated, the global brightness setting 110 may be the same as or correlated with a user adjustable display brightness. Moreover, the global brightness setting 110 may be adjusted in the image processing circuitry 28 and/or based on detected ambient lighting. Additionally, as should be appreciated, the emission duty cycle may be indicative of a pulse-width modulation or a relative time of emission of a pixel during an image frame. For example, below a threshold brightness, the voltage and/or current may be held constant, and the emission pulse-width modulated at a particular duty cycle to obtain darker luminance levels.

The brightness-normalized pixel values 116 may be utilized with the gain maps 74 (e.g., upsampled gain maps 74') to generate compensated gains 118 via the gain adjustment 76. For example, the gain adjustment 76 may include a 2D compensation look-up table (LUT) 120 that outputs the compensated gains 118 based on the gain values of the gain maps 74 and the brightness-normalized pixel values 116. In other words, the gain adjustment 76 makes per pixel gain adjustments based on the brightness-normalized pixel values 116 to compensate for the parasitic capacitance 78 and associated increased current 106 through the light emissive element 94. As should be appreciated, while discussed herein as utilizing a 2D LUT to provide the gain adjustment 76, any suitable method for generating the compensated gains 118 may be utilized such as one or more equation-based compensations computed in software. However, the 2D compensation LUT 120 may provide increased efficiency for the BIC sub-block 62 by providing quickly accessible values for what would otherwise be a list of non-linear and/or piecewise functions.

Additionally, in some embodiments, values (e.g., tap points) of the 2D compensation LUT 120 may be interpolated between to generate compensated gains 118 that do not align with the prefilled compensation gains of the 2D compensation LUT 120. Furthermore, the 2D compensation LUT 120 may include non-uniformly spaced tap points in one or both dimensions (e.g., along the input values of the gain maps 74 and/or the brightness-normalized pixel values 116). In other words, regions of the brightness-normalized pixel values 116 and/or gain values of the gain maps 74 that may have larger effects on the output compensated gains 118 may be more densely populated with tap points. Moreover, in some embodiments, each color component (e.g., each gain map 74) may utilize a separate 2D compensation LUT 120. In other words, the amount of gain adjustment 76 may vary based on color component.

Furthermore, in some embodiments, the 2D compensation LUT 120 may be regenerated periodically (e.g., once per day, week, month, year, etc. and/or after an amount of "on" time of the electronic display since the previous regeneration) to account for the long-term aging of the electronic display. Indeed, as discussed above, the 2D compensation LUT 120 utilizes the gain values of the gain maps 74, computed based on the burn-in history map 70, to generate the compensated gains 118. As such, the span of values (e.g., tap points) of the 2D compensation LUT 120 need only encompass the gain values of the gain maps 74 that correspond to the span of ages of the pixels of the burn-in history map 70. As such, as the electronic display 12 ages as a whole, certain values of the 2D compensation LUT that will no longer be utilized (e.g., corresponding to amounts of aging that have been surpassed) may be replaced with new values (e.g., corresponding to the currently highest amounts of pixel aging) may be added. As such, the 2D compensation LUT 120 may be regenerated based on the span of estimated amounts of aging of the burn-in history map 70.

Additionally, in some embodiments, the compensated gains 118 may be normalized via a normalization factor 122 to generate normalized gains 124, and the BIC sub-block may apply gains 126 (e.g., apply the normalized gains 124) to the input image data 58 to generate the compensated image data 60. In some embodiments, the normalization factor 122 may ensure that the normalized gains 124 to be applied to the input image data 58 are less than or equal to one, such that the maximum pixel value is not clipped. By applying the normalized gains 124, the pixels of the electronic display 12 that are likely to exhibit the greatest amount of aging will appear to be equally as bright as pixels with less aging. As should be appreciated, the normalization factor 122 may take any suitable form, and may take into account a maximum gain to be applied and/or the global brightness setting 110 of the electronic display 12, which may be set based on a user setting, an ambient light sensor, a time of day, and/or other parameters. Furthermore, different normalization factors 122 may be used for different color components of compensated gains 118.

By adjusting the gain maps 74 (e.g., upsampled gain maps 74) based on the brightness-normalized pixel values 116, normalizing the compensated gains 118, and applying the normalized gains 124 to the input image data 58 the BIC sub-block 62 may compensate for burn-in related aging of the pixels of an electronic display. Furthermore, as discussed herein, the compensated image data 60 may be utilized by the pixel BIS sub-block 64 and to generate a history update 66 and maintain the burn-in history map 70.

Figure 13:
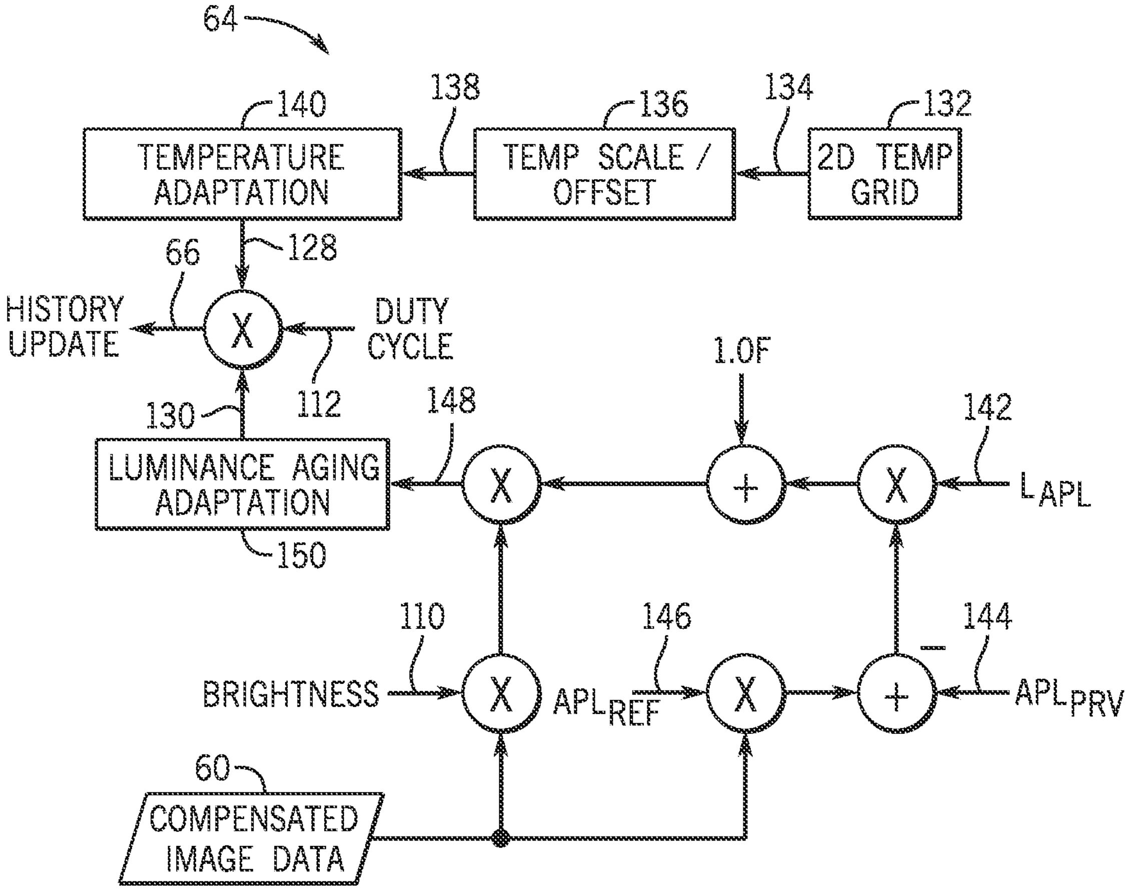
FIG. 13 is a schematic diagram of the BIS sub-block of FIG. 8, in accordance with an embodiment.

FIG. 13 is a block diagram of an example BIS sub-block 64 that utilizes the compensated image data 60 to generate a history update 66. In some embodiments, the history update 66 may be generated from a combination of a temperature aging factor 128 and a luminance aging factor 130. The temperature aging factor 128 takes into account the aging effect of temperature on pixel efficiency as the pixels are utilized to emit light. In some embodiments, a temperature grid 132 may provide temperatures 134 at one or more locations across the electronic device 10 and/or electronic display 12. As should be appreciated, the temperature grid 132 may be uniformly spaced or non-uniformly spaced across the display panel 40. Moreover, in some embodiments, the temperatures 134 for each pixel may be interpolated from the temperature grid 132. Furthermore, in some scenarios, a single temperature value (e.g., measured, estimated, or preset value) may utilized instead of individual temperatures 134. In some embodiments, the temperatures 134 (or single temperature value) may undergo a temperature scale/offset 136 to define a temperature differential 138 indicative of the local temperature's delta from a preset temperature, and the temperature differential 138 may be used to calculate the temperature aging factor 128 (e.g., via a temperature adaptation calculation 140). The temperature adaptation calculation 140 may utilize the temperature differential 138 in a linear or non-linear equation (e.g., calculated via a look-up-table (LUT), one or more processors, etc.) to calculate an expected contribution to the history update 66 due to the temperatures 134 of the pixels. As should be appreciated, the temperature differential 138, temperature 134, or single temperature value may be used in determining the temperature aging factor 128 depending on implementation.

Furthermore, the luminance aging factor 130, indicative of the expected contribution to the history update 66 due to the luminance outputs of the pixels, may be calculated based on the compensated image data 60 and the global brightness setting 110. Additionally, one or more reference parameters (which may be included as gain parameters 68) such as the average pixel luminance of the image frame 142, the average pixel luminance of the previous image frame 144, and/or an average pixel luminance calibration reference value 146. Indeed, the changes from previous luminance levels to the current luminance levels may contribute to pixel aging, and one or more calibration/reference values (e.g., the average pixel luminance calibration reference value 146) may be used as part of the calculation of the luminance aging factor 130.

Additionally, in some embodiments, the global brightness setting 110 may be normalized by a maximum of the global brightness setting 110. As should be appreciated, the parameters used herein are given as examples and additional or fewer reference parameters may be used in conjunction with the compensated image data 60 and/or global brightness setting 110 to generate the luminance aging factor 130. Moreover, in some embodiments, the gain parameters 68 discussed above, a subset thereof, and/or other parameters may be utilized to generate an intermediate luminance aging factor 148 used in a luminance aging adaptation calculation 150 to calculate the luminance aging factor 130 (e.g., via a LUT, one or more processors, etc.) via one or more linear or non-linear equations.

Moreover, in some embodiments, the duty cycle factor 112 (e.g., representative of the emission duty cycle of the pixels over an image frame) may be utilized to augment the combination of the temperature aging factor 128 and the luminance aging factor 130. As should be appreciated, the effect of burn-in on a pixel may differ at different emission duty cycles and, thus, the duty cycle factor 112 may be used to augment the history update 66.

Figure 14:
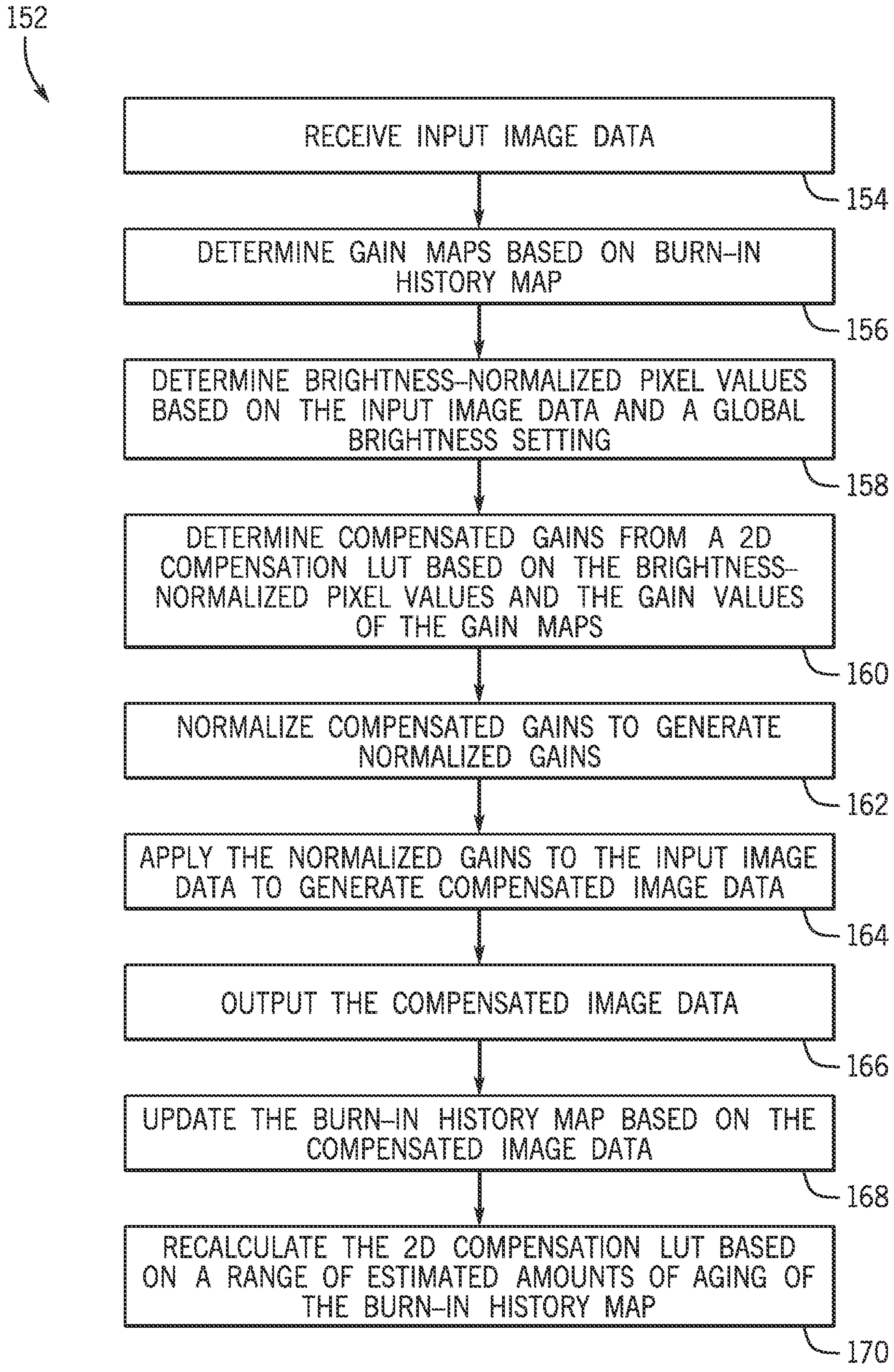
FIG. 14 is a flowchart of an example process for performing BIS collection and BIC, in accordance with an embodiment.

FIG. 14 is a flowchart 152 of an example process for performing burn-in compensation and statistics gathering. The BIC/BIS block 52 may receive input image data 58 (process block 154), and determine gain maps 74 based on a burn-in history map 70 (process block 156). Additionally, brightness-normalized pixel values 116 may be determined based on the input image data 58 and the global brightness setting 110 of the electronic display 12 (process block 158). Additionally, the BIC/BIS block 52 may determine compensated gains 118 from a 2D compensation LUT 120 based on the brightness-normalized pixel values 116 and the gain values of the gain maps 74 (process block 160) and normalize (e.g., via the normalization factor 122) the compensated gains 118 to generate normalized gains 124 (process block 162). The normalized gains 124 may be applied to the input image data 58 (process block 164) to generate the compensated image data 60, and the compensated image data may be output (process block 166), such as to the electronic display 12 and/or for further processing via one or more other processing blocks 54. Based on the compensated image data 60, the burn-in history map 70 may be updated (process block 168), such as via a history update 66. Additionally, in some embodiments, the 2D compensation LUT 120 may be recalculated based on a range of the estimated amounts of aging of the burn-in history map 70 (process block 170).

By tracking the estimated amount of burn-in related aging that has taken place in the pixels, per-pixel gains (e.g., gain maps 74) may be obtained to compensate for the effects of burn-in. Moreover, by performing a gain adjustment 76 based on the desired luminance outputs of the pixels (e.g., based on the brightness-normalized pixel values 116), the burn-in compensation may account for inverse burn-in effects, such as at low luminance outputs. In this way, the pixels of the electronic display 12 that exhibit changes in pixel efficiency due to non-uniform aging and/or parasitic capacitance 78 within the pixel circuitry 80 will appear to have aged uniformly. As such, perceivable burn-in artifacts on the electronic display 12 may be reduced or eliminated. Furthermore, although the flowchart 152 is shown in a given order, in certain embodiments, process/decision blocks may be reordered, altered, deleted, and/or occur simultaneously. Additionally, the flowchart 152 is given as an illustrative tool and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. An electronic device comprising:

an electronic display comprising a pixel and configured to display an image based on compensated image data; and image processing circuitry communicatively coupled to the electronic display and configured to:

receive image data of an image frame to be displayed, the image data comprising a pixel value corresponding to the pixel;

determine a gain value for the pixel based on an aging value of the pixel, wherein the aging value is based on previously displayed pixel values of the pixel;

adjust the gain value based on the pixel value to generate an adjusted gain value, wherein adjusting the gain value comprises applying a two-dimensional look-up-table (2D LUT) based on the gain value and the pixel value; and adjust the pixel value of the image data based on the adjusted gain value to generate, at least in part, the compensated image data.

2. The electronic device of claim 1, wherein the image processing circuitry is configured to update an aging history of the electronic display based on the compensated image data to generate an updated aging history, wherein the aging value is based on the aging history.

3. The electronic device of claim 2, wherein the image processing circuitry is configured to update the 2D LUT based on a range of values of the updated aging history, wherein the range of values corresponds to aging values associated with a plurality of pixels of the electronic display, wherein the pixel is one of the plurality of pixels.

4. The electronic device of claim 2, wherein updating the aging history comprises:

determining a luminance aging factor indicative of a first contribution to an estimated amount of aging of the pixel associated with a luminance output of the pixel corresponding to the compensated image data;

determining a temperature aging factor indicative of a second contribution to the estimated amount of aging of the pixel associated with temperature; and combining the luminance aging factor and the temperature aging factor.

5. The electronic device of claim 1, wherein the 2D LUT is configured to output a compensated gain value, and wherein adjusting the gain value comprises normalizing the compensated gain value based on a maximum gain.

6. The electronic device of claim 1, wherein adjusting the gain value comprises decreasing the gain value.

7. The electronic device of claim 1, wherein adjusting the gain value comprises adjusting the gain value based on a brightness-normalized pixel value, wherein the brightness-normalized pixel value is based on the pixel value and a brightness setting of the electronic display.

8. The electronic device of claim 1, wherein the pixel comprises an organic light-emitting-diode (OLED).

9. The electronic device of claim 1, wherein adjusting the gain value based on the pixel value comprises adjusting the gain value based on an estimated amount of efficiency of the pixel that varies based on the pixel value.

10. Image processing circuitry having burn-in compensation circuitry configured to:

receive image data of an image frame to be displayed, the image data comprising a pixel value associated with a pixel of an electronic display;

determine a gain value for the pixel based on an aging value of the pixel, wherein the aging value is based on previously displayed pixel values of the pixel;

adjust the gain value based on the pixel value to generate an updated gain value, wherein adjusting the gain value comprises using a two-dimensional look-up-table (2D LUT) based on the gain value and the pixel value;

apply the updated gain value to the pixel value of the image data to generate, at least in part, compensated image data; and output the compensated image data.

11. The image processing circuitry of claim 10, wherein adjusting the gain value comprises adjusting the gain value based on a brightness-normalized pixel value, wherein the brightness-normalized pixel value is based on the pixel value and a brightness setting of the electronic display.

12. The image processing circuitry of claim 11, wherein the burn-in compensation circuitry is configured to determine the brightness-normalized pixel value based on the pixel value, the brightness setting, and a duty cycle of the pixel.

13. The image processing circuitry of claim 11, wherein adjusting the gain value comprises applying the 2D LUT based on the gain value and the brightness-normalized pixel value.

14. The image processing circuitry of claim 13, wherein the 2D LUT is configured to output a compensated gain value, and wherein adjusting the gain value comprises normalizing the compensated gain value based on a maximum gain and the brightness setting.

15. The image processing circuitry of claim 10, comprising burn-in statistics circuitry configured to update an aging history of the electronic display based on the compensated image data to generate an updated aging history, wherein the aging value is based on the aging history.

16. The image processing circuitry of claim 15, wherein the image processing circuitry is configured to update the 2D LUT based on a range of values of the updated aging history, wherein the range of values corresponds to aging values associated with a plurality of pixels of the electronic display, wherein the pixel is one of the plurality of pixels.

17. The image processing circuitry of claim 10, wherein outputting the compensated image data comprises directing the compensated image data to a subsequent portion of the image processing circuitry.

18. A non-transitory, machine-readable medium comprising instructions, wherein, when executed by one or more processors, the instructions cause the one or more processors to control image processing circuitry to perform operations or to perform the operations, wherein the operations comprise:

receiving image data of an image frame to be displayed, the image data comprising a pixel value associated with a pixel of an electronic display;

determining a gain value for the pixel based on an aging value of the pixel, wherein the aging value is based on previously displayed pixel values of the pixel;

adjusting the gain value based on the pixel value to generate an updated gain value, wherein adjusting the gain value comprises using a two-dimensional look-up-table (2D LUT) based on the gain value and the pixel value;

applying the updated gain value to the pixel value of the image data to generate, at least in part, compensated image data; and outputting the compensated image data.

19. The non-transitory, machine-readable medium of claim 18, wherein the operations comprise determining a brightness-normalized pixel value based on the pixel value and a brightness setting of the electronic display, wherein adjusting the gain value comprises applying the 2D LUT based on the gain value and the brightness-normalized pixel value.

20. The non-transitory, machine-readable medium of claim 19, wherein the operations comprise:

updating an aging history of the electronic display based on the compensated image data to generate an updated aging history, wherein the aging value is based on the aging history; and updating the 2D LUT based on a range of values of the updated aging history, wherein the range of values corresponds to aging values associated with a plurality of pixels of the electronic display, wherein the pixel is one of the plurality of pixels.

* * * * *